H. C. FORD.
MECHANICAL MOVEMENT.
APPLICATION FILED MAR. 13, 1916.
1,317,915.
Patented Oct. 7, 1919.
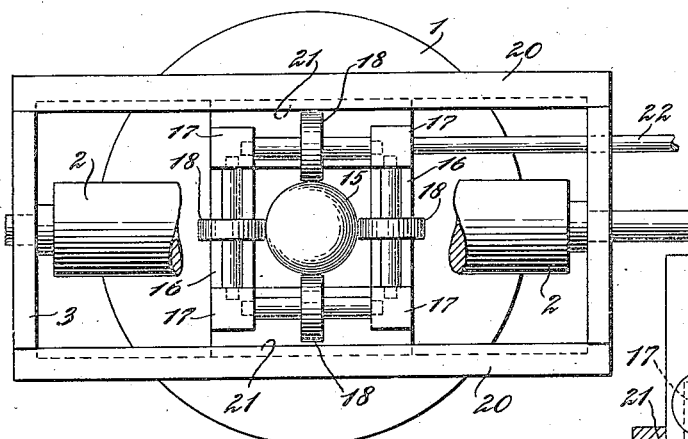
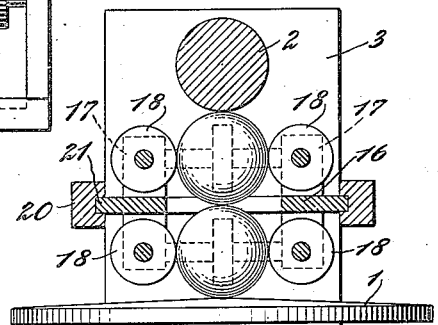
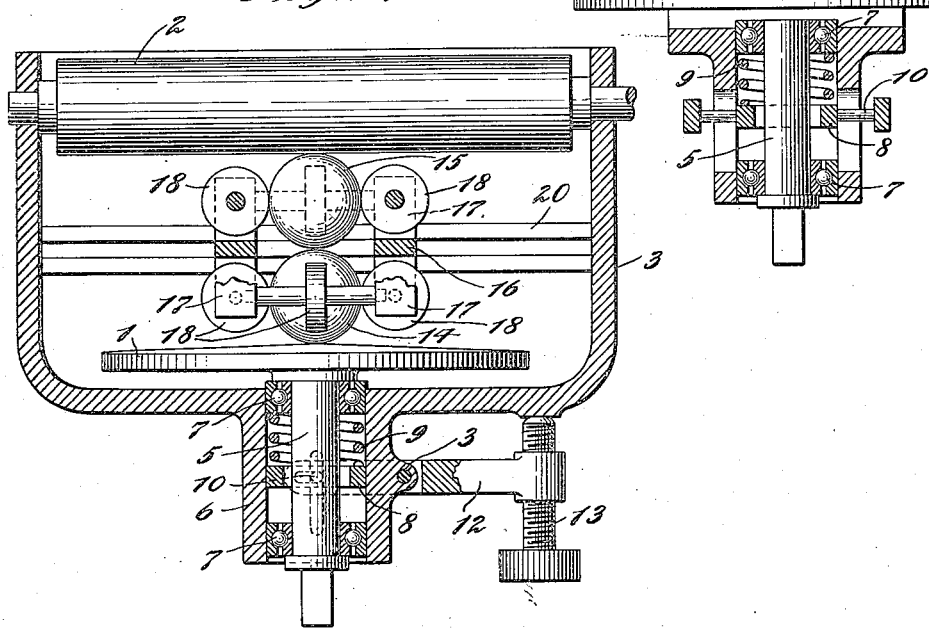
Inventor
Hannibal C. Ford
By his Attorneys
Rosenbaum Stockbridge & Borst

UNITED STATES PATENT OFFICE.

HANNIBAL C. FORD, OF NEW YORK, N. Y., ASSIGNOR, BY MESNE ASSIGNMENTS, TO FORD INSTRUMENT COMPANY, INC., A CORPORATION OF NEW YORK.

MECHANICAL MOVEMENT.

1,317,915.

Specification of Letters Patent.

Patented Oct. 7, 1919.

Application filed March 13, 1916. Serial No. 83,749.

*To all whom it may concern:*

Be it known that I, HANNIBAL C. FORD, a citizen of the United States, residing at the city of New York, in the borough of Queens and State of New York, have invented certain new and useful Improvements in Mechanical Movement, of which the following is a full, clear, and exact description.

This invention relates to a mechanical movement. The primary object of the invention is to provide a power transmitting mechanism comprising two rotary elements, and a device interposed between the two elements for transmitting the rotation of one element to the other, and in rolling contact therewith, which device is under all conditions movable as a unitary structure relatively to said elements, while remaining in rolling contact therewith during such movement, whereby pressure may be applied to maintain the parts in driving relation and yet the relative position of the device and the elements may be shifted at will.

With this and other objects in view, the invention consists of two rotary elements and a plurality of super-imposed balls interposed between the two elements in rolling contact with one another and with the elements, respectively, which balls are maintained in their proper relative position by a suitable supporting structure which is movable with the balls. By utilizing a plurality of balls, these balls are capable of being moved in any direction with respect to the surfaces of the elements and yet will remain in rolling contact therewith while transmitting the rotation of one element to the other. One adaptation of the invention is to variable speed mechanisms, in which the two elements consist of the usual rotary driving and driven elements with which the interposed balls are in rolling contact, whereby by shifting the position of the balls the relative speeds of the driving and driven elements may be varied.

In the accompanying drawings, the invention is illustrated in connection with a roller and disk variable speed mechanism, but it is to be understood that other driving and driven elements, such as are used in various variable speed mechanisms, may be substituted for the roller and disk.

Figure 1 is a front elevation of a variable ball and disk speed mechanism constructed in accordance with the principles of my invention;

Fig. 2 is a sectional view thereof; and

Fig. 3 is a transverse section.

In the illustrated embodiment of the invention shown herein, the two main rotatable elements comprise a disk 1 and a roller 2, either one of which may be the driving element, as for example, disk 1. These elements are mounted in a yoke-shaped frame 3 between the arms of which at the upper ends is rotatably mounted the roller 2. The disk 1 is supported on a spindle 5 which passes through a sleeve 6 extending from the connecting piece of the yoke and is mounted for rotation in this sleeve upon ball bearings 7—7. Surrounding the spindle or shaft 5 and interposed between the upper set of ball bearings 7 and a slidable collar 8, is a spring 9. The collar 8 carries radially extending pins 10, 10, which pass through suitable slots in the boss and are secured at their outer ends to the arms of a yoke-shaped lever arm 12, which is pivoted to the boss as at 13. Passing through the free end of the lever arm is a regulating screw 13′, the point of which rests against the yoke-shaped frame and is held in engagement therewith by the expansive force of the spring 9, which will also exert its tension against the upper ball bearings 7, which are slidably mounted within the sleeve 6. This bearing abuts against a shoulder on the spindle and hence the disk is urged toward the roller 2.

Interposed between the disk 1 and the roller 2 are a plurality of balls, two such balls being shown in the construction illustrated and designated 14 and 15. These balls are arranged one above the other and in rolling contact with each other and with the disk and roller, respectively, the points of rolling contact being in vertical alinement. The balls are maintained in position by a cage comprising a hollow rectangular frame 16 having four posts 17 projecting from each face thereof. The posts provide supports for guide rollers 18. Two of these guide rollers are rotatably mounted between each two posts and each roller is mounted in rolling contact with one of the balls, the point of rolling contact being preferably in a horizontal plane through the center of the ball, Secured to the yoke-shaped frame on opposite sides thereof, are grooved slideways 20 in which grooves are slidably mounted slides 21, which as shown may be formed by extending the frame 16 on two sides thereof whereby the cage may be moved to cause the balls to travel radially along the disk when a change of the speed of the driven member is desired. This movement may be imparted to the cage in any desired manner and, for illustrative purposes, it is shown as being accomplished by means of a rod 22 carried by the frame 16.

The balls are maintained in frictional engagement with each other and with the disk and roller, respectively, by means of the spring 9, and associated parts, as described, and the pressure upon the balls may be varied by regulating the tension of this spring so that any slippage between the balls or between one of the balls and the driving or driven element, is eliminated.

The surface of the disk with which the ball contacts is preferably crowned so that as the balls are moved inwardly toward the center of the disk the pressure holding them in engagement with the driving and driven elements is automatically increased.

The operation of the mechanism is obvious from the description, but will be briefly stated. Let us assume that the disk is the driving element and is being constantly rotated by a part (not shown) which is connected to the shaft or spindle 5. If the balls are in the position shown in Fig. 1, that is, so that their points of rolling contact with each other and with the elements are in vertical alinement with the center of the disk, the balls will not be rotated by the rotation of the disk and the roller or driven element 2 will remain stationary. If, however, by moving the cage the balls are moved off their center position, the balls will immediately start to rotate, due to the fact that one of them is in rolling contact with the disk, which rotation will be transmitted through the other ball to the roller 2, and the farther the balls are moved from the center of the disk, the greater the speed of rotation of the driven element. This radial movement of the balls may be effected while the driving element is being constantly rotated without any slippage between one of the balls and the disk, between the balls themselves, or between the other ball and roller, since, upon a radial movement of the balls, each ball will be rotated upon an axis which is oblique to their normal axis of rotation. This result is obtained by the above construction without any bodily movement of either the driving or driven element which is impossible where only one ball is used. This feature is of importance as it enables the mechanism to be rigidly constructed and a high pressure applied to the parts which mechanism is adapted to be used to transmit relatively heavy loads.

It will be noted from the construction described that the pressure applied to the balls automatically increases as the speed of the driven member decreases, which will permit the mechanism to transmit relative heavy loads without any slippage of the balls. It should also be noted that by virtue of the conical shaped working face of the disk 1, a movement of the balls over this face will impart a slight bodily movement to the disk 1 in the direction of the axis of the supporting shaft 5 of the disk, which is mounted for such a movement by means of the spring 9 and associated parts. This movement of the disk may be utilized in other mechanical movements, if desired.

While I have disclosed my invention in connection with one illustrated embodiment thereof, it is obvious that the construction may be changed materially and yet come within the scope of the invention, as is particularly pointed out in the appended claims.

I claim:

1. A variable speed mechanism comprising a driving element and a driven element, a plurality of balls interposed between said elements in rolling contact with one another and with the driving and driven elements respectively, and means for holding said balls in their proper relative positions.

2. A variable speed mechanism comprising a driving element and a driven element, a plurality of balls interposed between said elements in rolling contact with one another and the driving and driven elements respectively, means surrounding said balls maintaining them in their proper relative positions and for moving them relatively to the driving and driven members.

3. A variable speed mechanism comprising a driving and a driven element, two balls in rolling contact with each other, one of said balls being in rolling contact with the driving and the other with the driven element, and movable means for holding in alinement the points of rolling contact of said balls with each other and with the driving and driven elements.

4. A variable speed mechanism comprising a driving and driven element, a plurality of balls interposed between said elements in rolling contact with one another and with the driving and driven elements respectively, means for holding said balls in their proper relative positions with respect to each other, and means for applying pressure to said parts at their points of rolling contact.

5. A variable speed mechanism comprising a driving element and a driven element, a plurality of balls interposed between said elements in rolling contact with one another and the driving and driven elements respectively, means surrounding said balls maintaining them in their proper relative positions and for moving them relatively to the driving and driven members, and means for applying pressure to said parts at their points of rolling contact.

6. A variable speed mechanism comprising a driving and a driven element, two balls in rolling contact with each other, one of said balls being in rolling contact with the driving and the other with the driven element, movable means for holding said balls with their points of rolling contact with each other and the driving and driven elements in alinement, and means for applying pressure to said parts at their points of rolling contact.

7. A variable speed mechanism comprising a driving element and a driven element, a plurality of balls interposed between said elements in rolling contact with one another and with the driving and driven elements respectively, movable means for holding said balls in their proper relative positions, and means for applying a pressure to said parts at their points of rolling contact which varies with the position of said balls.

8. A variable speed mechanism comprising a driving and a driven element, two balls in rolling contact with each other, one of said balls being in rolling contact with the driving and the other with the driven element, movable means for holding said balls with their points of rolling contact with each other and the driving and driven elements in alinement, and means for applying pressure to said parts at their points of rolling contact and for varying said pressure upon a movement of said balls.

9. A variable speed mechanism comprising a driving element and a driven element, a plurality of balls interposed between said elements in rolling contact with one another and with the driving and driven elements respectively, and movable means for holding said balls in their proper relative positions, and means for applying pressure to said parts at their points of rolling contact, corresponding points of contact on said driving and driven elements being spaced unequal distances apart whereby by moving said balls the pressure is automatically varied.

10. A variable speed mechanism comprising a driving and a driven member one of which is a disk, a member movable radially across the face of the disk and serving to transmit the motion of the driving to the driven elements, and means for applying pressure to said parts at their points of rolling contact, said disk having a curved face whereby upon a movement of said member the pressure upon the same is varied.

11. A variable speed mechanism comprising a driving and a driven element, a device in continuous driving frictional engagement with said elements, said device being freely movable as a unitary structure to change its position with respect to said elements and remaining in rolling contact with said elements irrespective of whether said elements are in motion or at rest or whether said device is moved bodily with respect to said elements.

12. A mechanical movement comprising two elements, and a plurality of superimposed freely rotatable balls interposed between said elements in rolling contact with one another and with the working surfaces of said elements, respectively.

13. A mechanical movement comprising two elements, a plurality of superimposed freely rotatable balls interposed between said elements in rolling contact with one another and with the working surfaces of said elements, respectively, and means for applying pressure between said balls and said elements.

14. A mechanical movement comprising two elements one at least of which is movable, a plurality of superimposed freely rotatable balls interposed between said elements in contact with one another and with the working surfaces of said elements, respectively.

15. A mechanical movement comprising two elements one at least of which is movable, a plurality of balls interposed between said elements in contact with one another and with the working surfaces of said elements, respectively, and means for applying a pressure between said elements and balls.

16. A mechanical movement comprising two elements, a plurality of freely rotatable balls interposed between said elements in rolling contact with one another and with the working surfaces of said elements, respectively, and means surrounding said balls maintaining them in their proper relative position, said means and balls being relatively movable with respect to said elements as a unitary structure.

17. A mechanical movement comprising two elements one of which at least is movable, a plurality of balls interposed between said elements in rolling contact with one another and with said elements, respectively, means surrounding said balls for holding them in their proper relative position with respect to one another and with respect to said elements, said means and balls being relatively movable with respect to said elements as a unitary structure.

18. A mechanical movement comprising two elements having a relative movement toward and away from each other, a plurality of balls interposed between said elements in rolling contact with each other and with the working surfaces of said elements, the corresponding points of contact on said working surfaces with which said balls engage being spaced unequal distances apart, whereby said elements will have a bodily relative movement toward and away from each other upon a change of the points of contact of said balls with the working surfaces of said elements.

19. A mechanical movement comprising two elements having a relative movement toward and away from each other, a plurality of balls interposed between said elements in rolling contact with one another and with the working surfaces of said elements, the corresponding points of contact on said working surfaces with which said balls engage being spaced unequal distances apart, whereby said elements will have a bodily relative movement toward and away from each other upon a change of the points of contact of said balls with the working surfaces of said elements, and means for exerting a pressure upon said balls through said elements.

20. In a friction gearing, the combination with driving and driven members whose axes lie in a common plane, of friction connections therebetween including a pair of spherical connecting members having parallel axes disposed in the said common plane of the axes of said driving and driven members and in contact with one another, a series of radially disposed casters around each of the said connecting members and in contact therewith, whereby to support the same, and a frame in which said casters are supported, movable within the space between the driving and driven members, for the purpose described.

21. In a friction gearing, the combination with driving and driven members whose axes lie in a common plane, of friction connections therebetween including spherical connecting members in contact with one another, and with the driving and driven members, said connecting members having parallel axes disposed in the said common plane of said driving and driven members, and an adjustable support in which the said connecting members are mounted and rotatable in all directions.

22. In a friction gearing, the combination with driving and driven members whose axes lie in a common plane, of friction connections therebetween including spherical connecting members in contact with one another, and with the driving and driven members, said connecting members having parallel axes disposed in the said common plane of said driving and driven members, and a support in which the said connecting members are mounted and movable in all directions, said support being movable in the space between the driving and driven members.

In witness whereof I subscribe my signature in the presence of two witnesses.

HANNIBAL C. FORD.

Witnesses:
　WALDO M. CHAPIN,
　JULE E. ZELENK.